(12) United States Patent
Gekht et al.

(10) Patent No.: US 8,905,736 B2
(45) Date of Patent: Dec. 9, 2014

(54) PORT FOR ROTARY INTERNAL COMBUSTION ENGINE

(75) Inventors: Eugene Gekht, Brossard (CA); Sebastien Bolduc, Longueuil (CA); David Gagnon-Martin, Longueuil (CA); Jean Thomassin, Ste-Julie (CA)

(73) Assignee: Pratt & Whitney Canada Corp., Longueuil, Quebec ( * ) Notice: Subject to any disclaimer, the term of this patent is extended or adjusted under 35 U.S.C. 154(b) by 240 days.

(21) Appl. No.: 13/427,021

(22) Filed: Mar. 22, 2012

(65) Prior Publication Data

US 2013/0247866 A1 Sep. 26, 2013

(51) Int. Cl.
*F04C 15/00* (2006.01)

(52) U.S. Cl.
USPC ......... 418/113; 418/125; 418/206.4; 123/207

(58) Field of Classification Search
USPC ........ 418/113, 125, 206.4, 78, 61.2; 123/207; 29/888.3, 559
See application file for complete search history.

(56) References Cited

U.S. PATENT DOCUMENTS

| | | | | |
|---|---|---|---|---|
| 1,453,683 | A * | 5/1923 | Kochendarfer | 418/266 |
| 3,097,632 | A | 7/1963 | Froede et al. | |
| 3,286,701 | A * | 11/1966 | Kling et al. | 418/101 |
| 3,364,867 | A | 1/1968 | Segelhorst et al. | |
| 3,448,727 | A * | 6/1969 | Kobayakawa | 418/61.2 |
| 3,744,940 | A | 7/1973 | Pierce et al. | |
| 3,844,256 | A | 10/1974 | Ishikawa et al. | |
| 3,881,847 | A | 5/1975 | Chen | |
| 3,883,273 | A | 5/1975 | King | |
| 3,894,819 | A | 7/1975 | Imaizumi et al. | |
| 3,954,256 | A | 5/1976 | Keijzer et al. | |
| 3,954,356 | A | 5/1976 | Winchell et al. | |
| 3,981,643 | A | 9/1976 | Canale | |
| 4,047,856 | A | 9/1977 | Hoffmann | |
| 4,054,400 | A * | 10/1977 | Mangus et al. | 418/83 |
| 4,297,090 | A | 10/1981 | Hoffmann | |
| 4,308,002 | A | 12/1981 | Di Stefano | |
| 4,386,890 | A | 6/1983 | Berkowitz | |
| 4,531,900 | A | 7/1985 | Jones et al. | |
| 4,543,926 | A | 10/1985 | Takubo et al. | |
| 4,738,602 | A * | 4/1988 | Yamamoto et al. | 418/113 |
| 6,146,120 | A | 11/2000 | Harms | |
| 6,575,719 | B2 | 6/2003 | Manner et al. | |
| 6,892,692 | B2 * | 5/2005 | Barrett | 418/61.2 |
| 7,707,987 | B2 * | 5/2010 | Guthrie | 418/113 |
| 2012/0227397 | A1 | 9/2012 | Willi et al. | |

FOREIGN PATENT DOCUMENTS

EP 2497902 9/2012

* cited by examiner

*Primary Examiner* — Thomas Denion
*Assistant Examiner* — Thomas Olszewski
(74) *Attorney, Agent, or Firm* — Norton Rose Fulbright Canada

(57) ABSTRACT

A Wankel engine with a peripheral wall of the stator body including a non-circular opening formed therethrough and defining at least part of a port. The opening has a perimeter defined by a first edge and remaining edges, with the remaining edges being located downstream of the first edge with respect to a direction of rotation of the rotor. The remaining edges extend non parallel to a longitudinal axis of the apex seals.

17 Claims, 5 Drawing Sheets

PORT FOR ROTARY INTERNAL COMBUSTION ENGINE

TECHNICAL FIELD

The application relates generally to an internal combustion engine using a rotary design to convert pressure into a rotating motion, more particularly, to a port for such an engine.

BACKGROUND OF THE ART

Rotary engines such as the ones known as Wankel engines use the eccentric rotation of a piston to convert pressure into a rotating motion, instead of using reciprocating pistons. In these engines, the rotor includes a number of apex portions which remain in contact with a peripheral wall of the rotor cavity of the engine throughout the rotational motion of the rotor through respective apex seals.

In use, the apex seals are pressed against the peripheral wall and as such may tend to penetrate the openings of peripheral intake and/or exhaust ports. As such, the apex seals may hit on downstream edges of these openings, which can lead to apex seal and/or port edge damage, which in turn may lead to increased leakage around the apex seals.

SUMMARY

In one aspect, there is provided a rotary engine comprising: a stator body having an internal cavity defined by two axially spaced apart end walls and a peripheral wall extending between the end walls, the cavity having an epitrochoid shape defining two lobes; a rotor body having three circumferentially spaced apex portions, the rotor body being engaged to an eccentric portion of a shaft to rotate and perform orbital revolutions within the cavity with each of the apex portions remaining in sealing engagement with the peripheral wall through at least one apex seal and separating three rotating chambers of variable volume defined in the cavity around the rotor body; and the peripheral wall including a non-circular opening formed through the peripheral wall and defining at least part of a port, the opening having a perimeter defined by a first edge and remaining edges, the remaining edges being located downstream of the first edge with respect to a direction of rotation of the rotor body, the remaining edges extending non parallel to a longitudinal axis of the at least one apex seal of each apex portion.

In another aspect, there is provided a stator body for a Wankel engine, the stator body comprising: two axially spaced apart end walls; a peripheral wall extending between the end walls and defining an internal cavity therewith, the cavity having an epitrochoid shape defining two lobes; and the peripheral wall having at least one triangular or substantially triangular opening defined therein and forming at least part of a port in communication with the cavity, the opening being bordered by an upstream edge and two interconnected angled downstream edges each extending toward a respective side of the upstream edge, the downstream edges being angled with respect to an axial direction of the stator body.

In a further aspect, there is provided a method of reducing apex seal impact on downstream edges of an opening of a peripheral port in Wankel engine, the method comprising: supporting the apex seal in two spaced apart locations adjacent an upstream edge of the opening; and reducing a distance between the two locations as a distance from the upstream edge increases.

DESCRIPTION OF THE DRAWINGS

Reference is now made to the accompanying figures in which.

DETAILED DESCRIPTION

Figure 1:
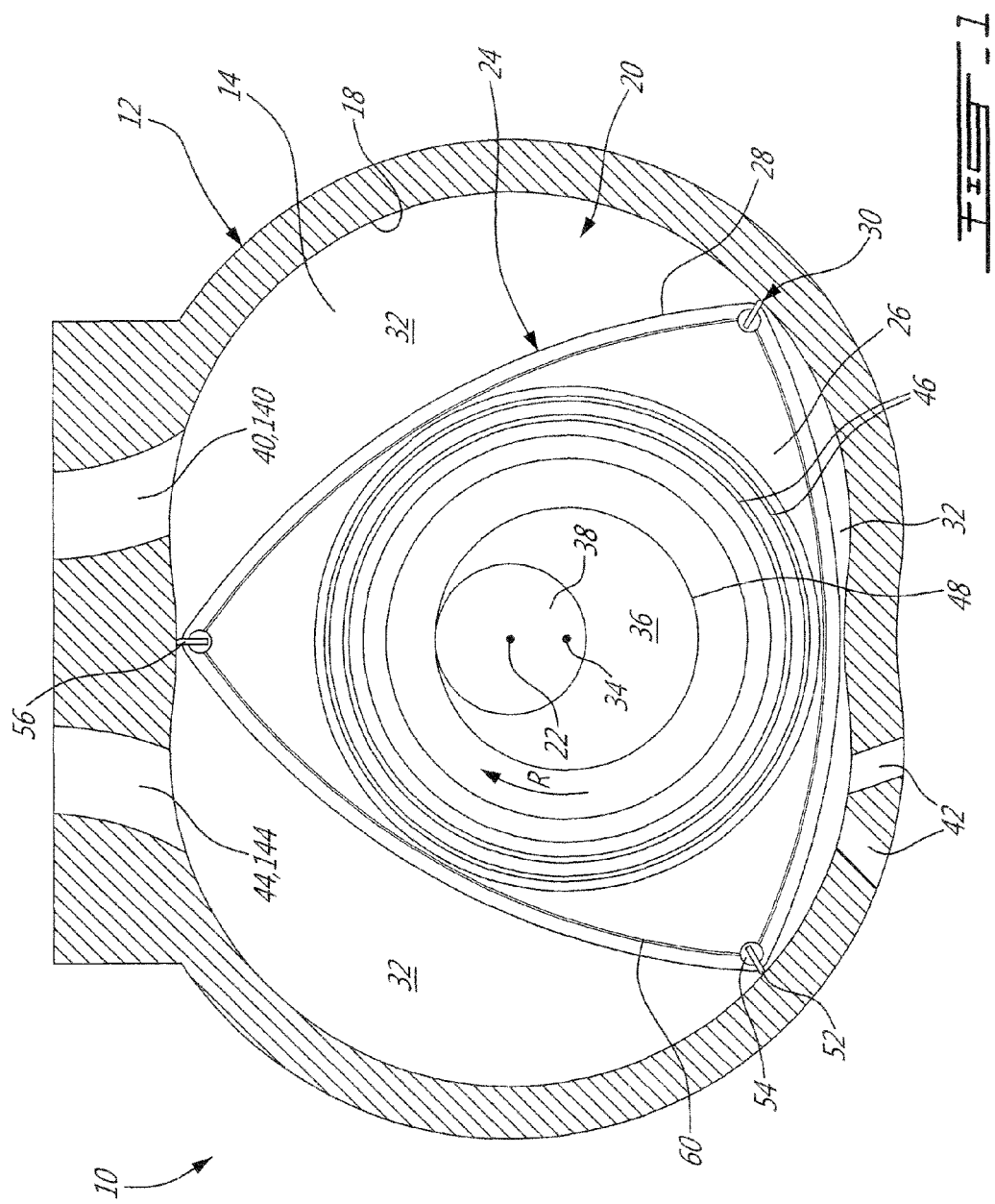
FIG. 1 is a schematic cross-sectional view of a rotary internal combustion engine.

Referring to FIG. 1, a rotary internal combustion engine 10 known as a Wankel engine is schematically shown. The engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. As will be detailed further below, the apex portions 30 are in sealing engagement with the inner surface of peripheral wall 18 to form three working chambers 32 between the inner rotor 24 and outer body 12. The geometrical axis 34 of the rotor 24 is offset from and parallel to the axis 22 of the outer body 12.

In the embodiment shown, the outer body 12 is stationary while the rotor 24 is journaled on an eccentric portion 36 of a shaft 38, the shaft 38 being co-axial with the geometrical axis 22 of the cavity 20. Upon rotation of the rotor 24 relative to the outer body 12 the working chambers 32 vary in volume. An intake port 40, 140 is provided through the peripheral wall 18 for admitting air, or air and fuel, into one of the working chambers 32. Passages 42 for a spark plug or other ignition mechanism, as well as for one or more fuel injectors (not shown) are provided through the peripheral wall 18. An exhaust port 44, 144 is also provided through the peripheral wall 18 for discharge of the exhaust gases from the working chambers 32. Alternately, the intake port 40, 140, the exhaust port 44, 144 and/or the passages 42 may be provided through the end wall 14.

During engine operation the working chambers 32 have a cycle of operation including the four phases of intake, compression, expansion and exhaust, these phases being similar to the strokes in a reciprocating-type internal combustion engine having a four-stroke cycle.

At least one oil seal ring 46 is disposed in a circular groove in each end face 26 of the rotor between the bearing 48 for the rotor 24 on the shaft eccentric 36 and the face seals. Each oil seal 46 prevents leakage flow of lubricating oil radially outwardly thereof between the respective rotor end face 26 and outer body end wall 14. Suitable springs (not shown) are provided for urging each oil seal 46 axially into contact with the adjacent end wall 14 of the outer body 12.

For efficient engine operation the working chambers 32 are sealed by apex seals, face seals and end seals.

Each rotor apex portion 30 has an apex seal 52 received in a corresponding groove defined from one end face 26 to the other. Each apex seal 52 protrudes radially from the peripheral face 28 and is biased radially outwardly against the peripheral wall 18 through a respective spring (not shown). In a particular embodiment, each apex seal 52 is made of a suitable type of ceramic. In a particular embodiment, each apex seal 52 is monolithic, i.e. is formed of a single seal member. Alternately, each apex seal 52 may be formed of two or more cooperating seal members. More than one apex seal 52 may also be provided on each apex portion 30.

An end or corner seal 54 receives each end of each apex seal 52 in a corresponding radial slot. Each end or corner seal 54 is biased against the respective end wall 14 through a suitable spring (not shown).

Each end face 26 of the rotor 24 has a face seal 60 extending between each pair of adjacent apex portions 30 and received in a corresponding groove of the end face 26. In a particular embodiment, each face seal 60 is monolithic. Each face seal 60 is arc-shaped and disposed adjacent to but inwardly of the rotor periphery throughout their length. A spring (not shown) located behind each face seal 60 urges it axially outwardly so that the face seal 60 projects axially away from the adjacent rotor end face 26 into sealing engagement with the adjacent end wall 14 of the cavity 20.

Figure 2:
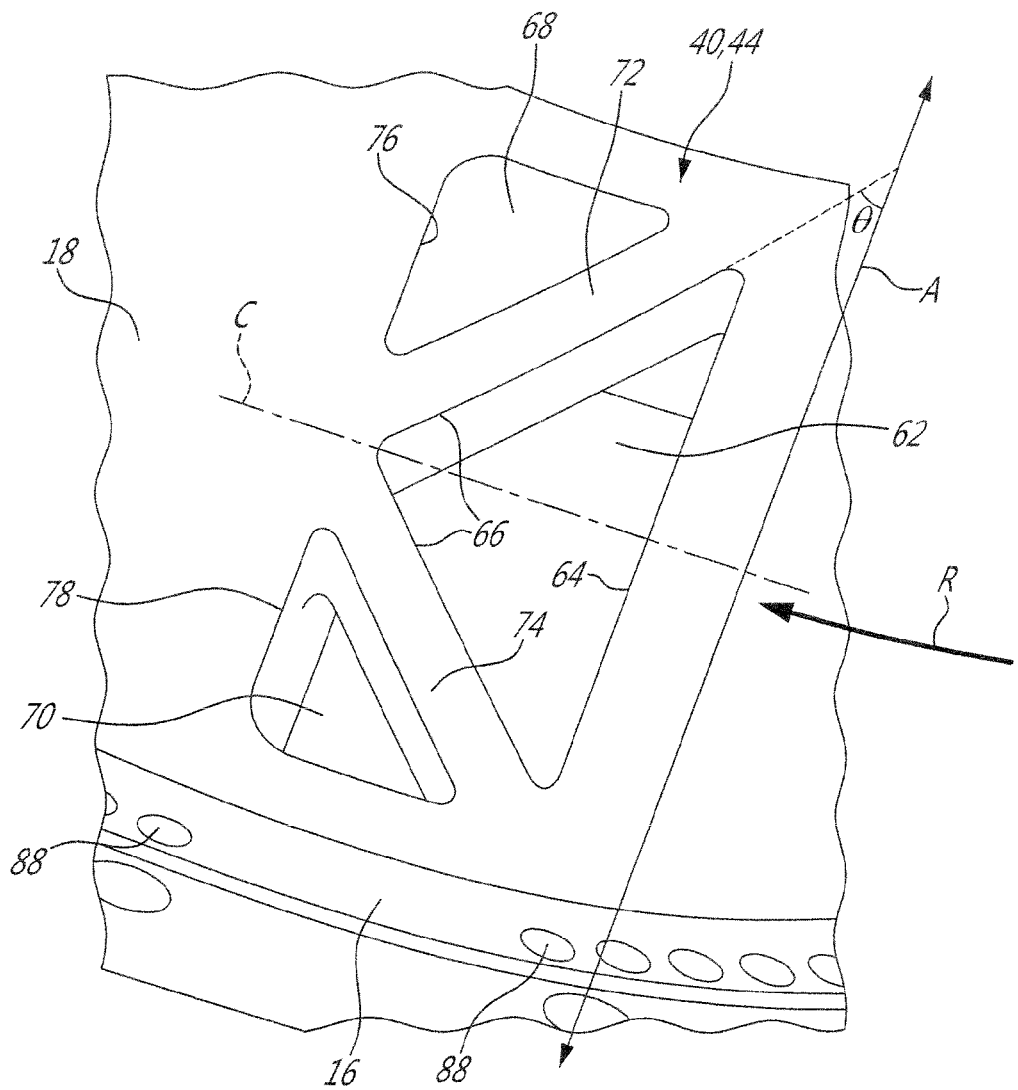
FIG. 2 is a schematic tridimensional view of a portion of a peripheral wall of a rotary engine such as shown in FIG. 1, showing a port in accordance with a particular embodiment.

Referring to FIG. 2, a port is shown, which may be the intake port 40 and/or the exhaust port 44 of a rotary engine such as shown in FIG. 1. The port 40, 44 includes a first non-circular opening 62 formed through the peripheral wall 18; in the embodiment shown, the first opening 62 has a triangular shape. The opening 62 has a perimeter defined by a first upstream edge 64, and two other downstream edges 66, located downstream of the first edge 64 with respect to the direction of rotation R of the rotor 24. The downstream edges 66 are angled with respect to the axial direction A of the outer body, i.e. they extend non-parallel with respect thereto. The axial direction A corresponds to that of the geometrical axis 22 of the cavity 20, and also to that of the longitudinal axis 56 of each apex seal 52 (see FIG. 1). The downstream edges 66 are thus angled with respect to the apex seals 52 as they circulate over the first opening 62 upon rotation of the rotor 24.

In the embodiment shown, the upstream edge 64 extends parallel or substantially parallel to the axial direction A; alternately, the upstream edge 64 can also be angled with respect to the axial direction A.

In the embodiment shown, the port 40, 44 also includes second and third non-circular openings 68, 70, shown here as being also triangular in shape, defined through the peripheral wall 18. The port 40, 44 has two bridging elements: a first bridging element 72 separating the first and second openings 62, 68 from one another, and a second bridging element 74 separating the first and third openings 62, 70 from one another. The inner surface of the bridging elements 72, 74 is aligned with the inner surface of the peripheral wall 18, such as to form a continuous contact surface for the apex seals 52. The bridging elements 72, 74 may have a smaller thickness than that of the remainder of the peripheral wall 18.

The bridging elements 72, 74 extend from a respective end of the upstream edge 64 of the first opening 62, and define the downstream edges 66 of the first opening 62. The bridging elements are interconnected at their ends opposite the upstream edge 64 and thus present an "inverted V" shape to the moving apex seals 52. The bridging elements 72, 74 thus "push" each apex seal 52 out of the first opening 62 as the seal moves over it, which may minimize or avoid impact of the apex seals 52 with the downstream edges 66 of the first opening 62. The bridging elements 72, 74 also support the apex seals 52 as they move over the downstream edges 76, 78 of the second and third openings 68, 70, which may minimize or avoid impact of the apex seals 52 therewith.

In a particular embodiment, the bridging elements 72, 74 and as such the downstream edges 66 of the first opening 62 extend at an angle θ of about 5° to 30° from the axial direction A.

In the embodiment shown, the openings 62, 68, 70 and bridging elements 72, 74 are shaped and relatively located such that the port 40, 44 is symmetrical about a circumferential central axis C thereof; alternate configurations are also possible.

In a particular embodiment, the openings 62, 68, 70 of the port 40, 44 extend along a portion of the peripheral wall 18 not exceeding 10% of its complete perimeter.

Figure 3:
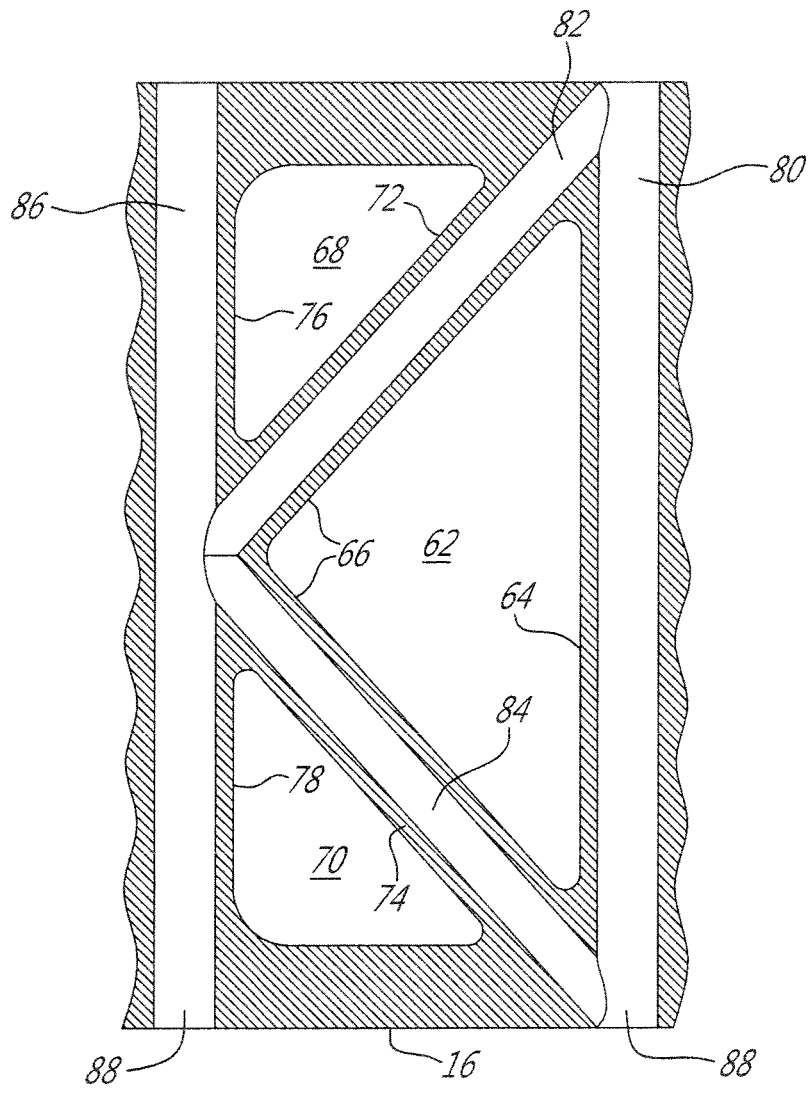
FIG. 3 is a schematic plan cross-sectional view of the portion of FIG. 2, showing cooling channels defined therein.

Referring to FIG. 3, in a particular embodiment, the port 40, 44 further includes a cooling channel defined through the peripheral wall adjacent each edge of the openings 62, 68, 70. As such, a first cooling channel 80 extends along the upstream edge 64 of the first opening 62, second and third cooling channels 82, 84 each extend through a respective one of the bridging elements 72, 74, and a fourth cooling channel 86 extends along the aligned downstream edges 76, 78 of the second and third openings 68, 70. The cooling channels 80, 82, 84, 86 are fluidly connected to a coolant circuit of the engine, for example through corresponding openings 88 defined along the opposed side surfaces 16 of the peripheral wall 18 (see also FIG. 2). Such a configuration allows for the cooling channels 80, 82, 84, 86 to be created by drilling in the peripheral wall 18 through the side surfaces 16.

Figure 4:
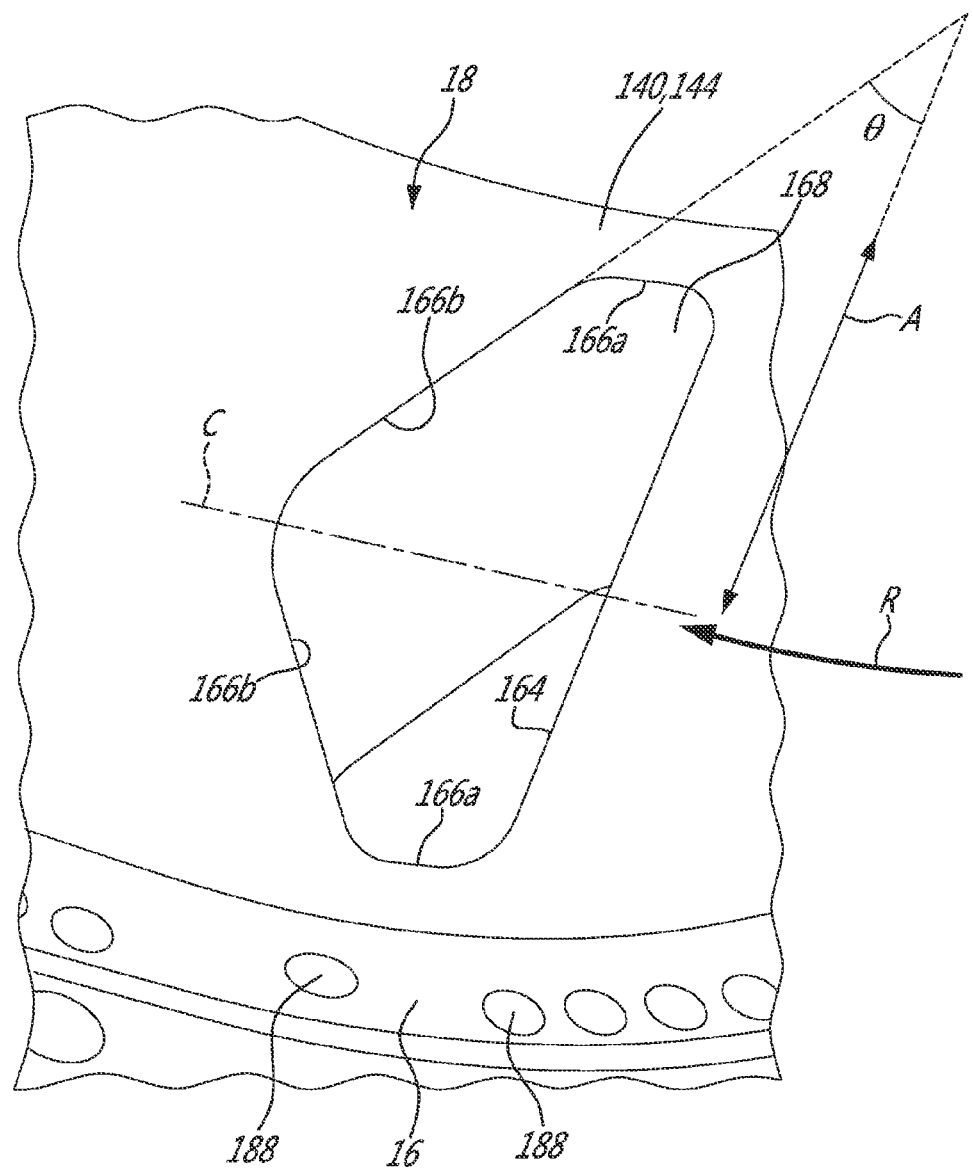
FIG. 4 is a schematic tridimensional view of a portion of a peripheral wall of a rotary engine such as shown in FIG. 1, showing a port in accordance with another particular embodiment.

Referring to FIG. 4, a port according to an alternate embodiment is shown, which may again be the intake port 140 and/or the exhaust port 144 of a rotary engine such as shown in FIG. 1. The port 140, 144 also includes a first non-circular opening 162, shown here as being substantially triangular in shape, formed through the peripheral wall 18. The downstream edges 166a,b are defined directly by the peripheral wall 18, i.e. the bridging elements and other openings are omitted. Again, the downstream edges 166a,b are angled with respect to the axial direction A. i.e. they extend non-parallel with respect thereto. The downstream edges include two relatively small circumferential downstream edges 166a each extending from a respective end of the upstream edge 164, and two interconnected angled downstream edges 166b each extending from a respective one of the circumferential downstream edges 166a and meeting to form a rounded downstream corner. As such, the opening 162 shown has a triangular shape with a rounded downstream corner and truncated upstream corners. The angled downstream edges 166b thus present an "inverted V" shape to the moving apex seals 52, "pushing" the apex seal 52 out of the opening 162, which may minimize or avoid impact of the apex seals 52 with the downstream edges 166b.

In a particular embodiment, the angled downstream edges 166b extend at an angle θ of about 5° to 30° from the axial direction A.

In the embodiment shown, the upstream edge 164 extends parallel or substantially parallel to the axial direction A; alternately, the upstream edge 164 can also be angled with respect to the axial direction A. In the embodiment shown, the opening 162 is symmetrical about a circumferential central axis C thereof; alternate configurations are also possible.

Figure 5:
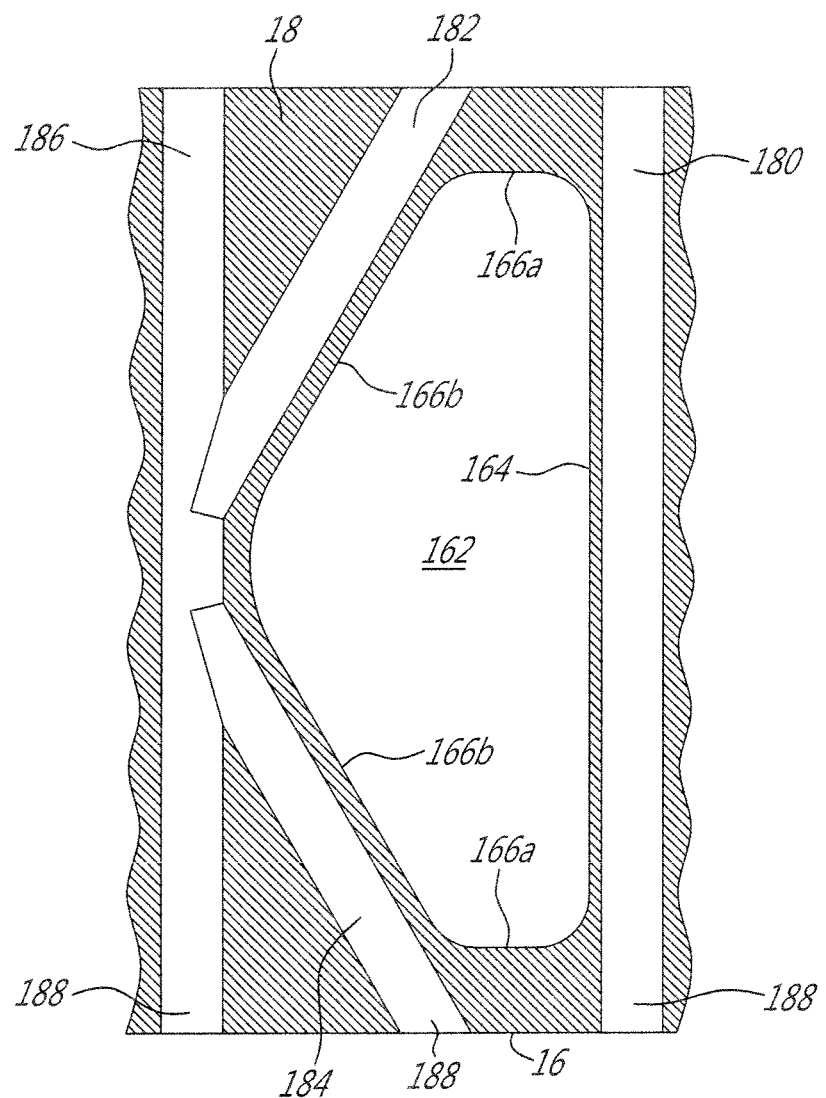
FIG. 5 is a schematic plan cross-sectional view of the portion of FIG. 4, showing cooling channels defined therein.

Referring to FIG. 5, in a particular embodiment, the port 140, 144 further includes cooling channels defined through the peripheral wall 18 around the opening 162. As such, a first cooling channel 180 extends along the upstream edge 164, and second and third cooling channels 182, 184 each extend along a respective one of the angled downstream edges 166b.

A fourth cooling channel 186 is also defined parallel to the first cooling channel 180 and adjacent the second and third cooling channels 182, 184, to provide a fluid connection from each of the second and third cooling channels 182, 184 to both side surfaces 16 of the peripheral wall 18. The cooling channels 180, 182, 184, 186 are fluidly connected to a coolant circuit of the engine, for example through a respective opening 188 defined along the opposed side surfaces 16 of the peripheral wall 18 (see also FIG. 4). Such a configuration allows for the cooling channels 180, 182, 184, 186 to be created by drilling in the peripheral wall 18 from the side surfaces 16.

In a particular embodiment, the opening 162 extends along a portion of the peripheral wall 18 not exceeding 10% of its complete perimeter.

The portion of the peripheral wall 18 shown in FIGS. 3 and 5 may be provided as an insert within the remainder of the peripheral wall 18, for example made of a material having a greater heat resistance than the remainder of the peripheral wall. Alternately, the portion shown may be continuous with and made of the same as the remainder of the peripheral wall.

Also, if the temperatures around the port 40, 44, 140, 144 are acceptable without additional cooling, the cooling channels 80, 82, 84, 86, 180, 182, 184, 186 may be omitted.

In use, the apex seals 52 are thus supported in two spaced apart locations adjacent the upstream edge 64, 164 of the opening 62, 162, and the distance between the two locations, defined by the angled downstream edges 66, 166*b*, is reduced as a distance from the upstream edge 64, 164 increases. Accordingly, the angled downstream edges 66, 166*b* of the first opening 62, 162, created by the bridging elements 72, 74 or by the configuration of the opening 162 within the peripheral wall 18, help "push" the apex seal 52 out of the opening 62, 162 as the apex seal 52 moves over the port 40, 44, 140, 144, which helps to prevent or minimize impact of the apex seal 52 on the edges defined by the port. Such may help minimizing seal damage, particularly (but not limited to) in cases where the apex seals 52 are made of ceramic, and/or damage to the edges of the port opening, thus potentially improving life of the engines, maintenance costs, and/or engine performances through reduced leakage at the apex seals.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A rotary engine comprising:
a stator body having an internal cavity defined by two axially spaced apart end walls and a peripheral wall extending between the end walls, the cavity having an epitrochoid shape defining two lobes;
a rotor body having three circumferentially spaced apex portions, the rotor body being engaged to an eccentric portion of a shaft to rotate and perform orbital revolutions within the cavity with each of the apex portions remaining in sealing engagement with the peripheral wall through at least one apex seal and separating three rotating chambers of variable volume defined in the cavity around the rotor body;
the peripheral wall including a first, second and third non-circular openings formed through the peripheral wall and together defining at least part of a port, the port having a first bridging element separating the first and second openings and a second bridging element separating the first and third openings, the bridging elements having an inner surface aligned with an inner surface of the peripheral wall, the first opening having a triangular perimeter defined by a first edge and two remaining edges with the remaining edges each defined by one of the bridging elements, the remaining edges being located downstream of the first edge with respect to a direction of rotation of the rotor body, the remaining edges and bridging elements extending non parallel to a longitudinal axis of the at least one apex seal of each apex portion, the bridging elements presenting an inverted V shape with respect to the direction of rotation.

2. The engine as defined in claim 1, wherein the bridging elements each have a first end extending from a respective end of the first edge and have interconnected second ends.

3. The engine as defined in claim 1, wherein the port further includes cooling channels defined through the peripheral wall around the first opening adjacent the edges thereof, the cooling channels being fluidly connected to a coolant circuit of the engine.

4. The engine as defined in claim 1, wherein the port further includes a cooling channel defined through each bridging element and cooling channels defined through the peripheral wall around and adjacent each opening, the cooling channels being fluidly connected to a coolant circuit of the engine.

5. The engine as defined in claim 1, wherein the first opening extends along at most 10% of a perimeter of the peripheral wall.

6. The engine as defined in claim 1, wherein the port is symmetrical with respect to a central axis thereof defined along a circumferential direction of the stator body.

7. A method of reducing apex seal impact on downstream edges of an opening of a peripheral port in Wankel engine, the method comprising:
supporting the apex seal in two spaced apart locations adjacent an upstream edge of the opening, the two spaced apart locations being defined by two bridging elements separating the opening from adjacent openings and the two bridging elements being angled with respect to an axial direction of the engine; and
reducing a distance between the two spaced apart locations as a distance from the upstream edge increases with an inverted V shape defined by the two bridging elements.

8. The engine as defined in claim 1, wherein the remaining edges includes two interconnected edges each extending toward a respective end of the first edge and angled about 5 to 30° from the longitudinal axis.

9. A stator body for a Wankel engine, the stator body comprising:
two axially spaced apart end walls;
a peripheral wall extending between the end walls and defining an internal cavity therewith, the cavity having an epitrochoid shape defining two lobes; and
the peripheral wall having at least first, second and third triangular or substantially triangular openings defined therein and together forming at least part of a port in communication with the cavity, the port having a first bridging element separating the first and second openings and a second bridging element separating the first and third openings, the bridging elements having an inner surface aligned with an inner surface of the peripheral wall, the first opening being bordered by an upstream edge and two interconnected angled downstream edges each extending toward a respective side of the upstream edge, the downstream edges being defined by the bridging elements, the downstream edges and the bridging elements being angled with respect to an axial direction of the stator body.

10. The stator body as defined in claim 9, wherein the angled downstream edges are angled about 5 to 30° from the axial direction.

11. The stator body as defined in claim 9, wherein the opening is symmetrical with respect to a central axis thereof defined along a circumferential direction of the stator body.

12. The stator body as defined in claim 9, wherein the port further includes a first cooling channel defined through the peripheral wall adjacent the upstream edge and second and third cooling channels defined through the peripheral wall adjacent a respective one of the angled downstream edges, the cooling channels being fluidly connected to a coolant circuit of the engine.

13. The stator body as defined in claim 9, wherein the port further includes a first cooling channel defined through the peripheral wall adjacent the upstream edge, second and third cooling channels defined through the peripheral wall in a respective one of the bridging element and a fourth cooling channel defined through the peripheral wall adjacent and downstream of the second and third openings, the cooling channels being fluidly connected to a coolant circuit of the engine.

14. The stator body as defined in claim 9, wherein the opening extends along at most 10% of a perimeter of the peripheral wall.

15. A method of reducing apex seal impact on downstream edges of an opening of a peripheral port in Wankel engine, the method comprising:
supporting the apex seal in two spaced apart locations adjacent an upstream edge of the opening, the spaced apart locations being defined by two bridging elements separating the opening from adjacent openings and angled with respect to an axial direction of the engine; and
reducing a distance between the two locations as a distance from the upstream edge increases with an inverted V shape defined by the bridging elements.

16. The method according to claim 15, wherein the distance between the two locations is reduced such as to be at a minimum value at a distance from the upstream edge corresponding to at most 10% of a perimeter of a rotor cavity.

17. The method according to claim 15, wherein the distance between the two locations is reduced symmetrically with respect to a central axis defined along a circumferential direction of the engine.

* * * * *